United States Patent
Su et al.

(10) Patent No.: US 9,924,171 B2
(45) Date of Patent: *Mar. 20, 2018

(54) LAYER DECOMPOSITION IN HIERARCHICAL VDR CODING

(71) Applicant: Dolby Laboratories Licensing Corporation, San Francisco, CA (US)

(72) Inventors: Guan-Ming Su, Fremont, CA (US); Sheng Qu, San Jose, CA (US); Samir N. Hulyalkar, Los Gatos, CA (US); Tao Chen, Palo Alto, CA (US); Walter C. Gish, Oak Park, CA (US); Hubert Koepfer, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,822

(22) Filed: Sep. 29, 2016

(65) Prior Publication Data

US 2017/0019670 A1 Jan. 19, 2017

Related U.S. Application Data

(63) Continuation of application No. 14/351,647, filed as application No. PCT/US2012/062932 on Nov. 1, 2012, now Pat. No. 9,497,456.

(Continued)

(51) Int. Cl.
*H04N 19/103* (2014.01)
*H04N 19/124* (2014.01)
(Continued)

(52) U.S. Cl.
CPC ......... *H04N 19/124* (2014.11); *H04N 19/103* (2014.11); *H04N 19/126* (2014.11); *H04N 19/30* (2014.11); *H04N 19/98* (2014.11)

(58) Field of Classification Search
None
See application file for complete search history.

(56) References Cited

U.S. PATENT DOCUMENTS

| 5,418,571 A | 5/1995 | Ghanbari |
| 6,111,596 A | 8/2000 | Haskell |

(Continued)

FOREIGN PATENT DOCUMENTS

| EP | 2144444 | 1/2010 |
| JP | 2002-510177 | 4/2002 |

(Continued)

OTHER PUBLICATIONS

Winken, M. et al., "Bit-Depth Scalable Video Coding", Image Procedding, IEEE International Conference, pp. 1-5-1-8 (Sep. 1, 2007).*

(Continued)

*Primary Examiner* — William C Vaughn, Jr.
*Assistant Examiner* — Lindsay Uhl

(57) ABSTRACT

Techniques use multiple lower bit depth (e.g., 8 bits) codecs to provide higher bit depth (e.g., 12+ bits) high dynamic range images from an upstream device to a downstream device. Multiple layers comprising a base layer and one or more enhancement layers may be used to carry video signals comprising image data compressed by lower bit depth encoders to a downstream device, wherein the base layer cannot be decoded and viewed on its own. Lower bit depth input image data to base layer processing may be generated from higher bit depth high dynamic range input image data via advanced quantization to minimize the volume of image data to be carried by enhancement layer video signals. The image data in the enhancement layer video signals may comprise residual values, quantization parameters, and mapping parameters based in part on a prediction method corresponding to a specific method used in the advanced (Continued)

quantization. Adaptive dynamic range adaptation techniques take into consideration special transition effects, such as fade-in and fade-outs, for improved coding performance.

24 Claims, 8 Drawing Sheets

Related U.S. Application Data

(60) Provisional application No. 61/555,978, filed on Nov. 4, 2011, provisional application No. 61/596,600, filed on Feb. 8, 2012.

(51) Int. Cl.
*H04N 19/98* (2014.01)
*H04N 19/30* (2014.01)
*H04N 19/126* (2014.01)

(56) References Cited

U.S. PATENT DOCUMENTS

| | | | |
|---|---|---|---|
| 6,275,531 | B1 | 8/2001 | Li |
| 8,295,625 | B2 | 10/2012 | Gao |
| 8,537,900 | B2 * | 9/2013 | Jang .............. H04N 19/172 375/240.24 |
| 8,731,287 | B2 | 5/2014 | Su |
| 9,066,070 | B2 | 6/2015 | Su |
| 9,497,456 | B2 * | 11/2016 | Su .............. H04N 19/30 |
| 2007/0201560 | A1 | 8/2007 | Segall |
| 2008/0175494 | A1 | 7/2008 | Segall |
| 2009/0003437 | A1 | 1/2009 | Cho |
| 2009/0046207 | A1 | 2/2009 | Salvucci |
| 2009/0323804 | A1 | 12/2009 | Gao |
| 2010/0020866 | A1 * | 1/2010 | Marpe .............. H04N 19/00569 375/240.02 |
| 2010/0046612 | A1 | 2/2010 | Sun |
| 2010/0128786 | A1 * | 5/2010 | Gao .............. H04N 19/147 375/240.13 |
| 2010/0135393 | A1 | 6/2010 | Ying Gao |
| 2010/0220795 | A1 | 9/2010 | Yin |
| 2010/0260260 | A1 | 10/2010 | Wiegand |
| 2012/0082243 | A1 | 4/2012 | Baylon |
| 2012/0314773 | A1 | 12/2012 | Gish |
| 2013/0148029 | A1 | 6/2013 | Gish |

FOREIGN PATENT DOCUMENTS

| | | | |
|---|---|---|---|
| JP | 5249784 | 6/2009 | |
| JP | 2011-517245 | 5/2011 | |
| JP | 2012-517764 | 8/2012 | |
| RU | 2378790 | 1/2010 | |
| WO | 99/37096 | 7/1999 | |
| WO | 2010/105036 | 9/2010 | |
| WO | WO 2010105036 A1 * | 9/2010 | .............. G06T 5/50 |
| WO | 2012/147022 | 11/2012 | |
| WO | 2012/158504 | 11/2012 | |

OTHER PUBLICATIONS

Mai, Z. et al., "Optimizing a Tone Curve for Backward-Compatible High Dynamic Range Image and Video Compression", IEEE Transactions on Image Processing, vol. 20, No. 6, pp. 1558-1571 (Dec. 3, 2010).*

Winken, M. et al., "Bit-Depth Scalable Video Coding", Image Processing, IEEE International Conference, pp. I-5-I-8 (Sep. 1, 2007).*

Mai, Z., et al., "Optimizing a Tone Curve for Backward-Compatible High Dynamic Range Image and Video Compression", IEEE Transactions on Image Processing, vol. 20, No. 6, pp. 1558-1571 (Dec. 3, 2010).*

Chen, Min et al "JPEG Compatible Coding of High Dynamic Range Imagery Using Tone Mapping and Vector Quantization" Picture Coding Symposium, Apr. 24-26, 2006.

Mai, Z et al. "Optimizing a Tone Curve for Backward-Compatible High Dynamic Range Image and Video Compression", IEEE Transactions on Image Processing, vol. 20, No. 6, Jun. 2011, pp. 1558-1571.

Park J H et al. "Requirement of SVC Color Space Scalability" JVT Meeting, MPEG Meeting: Oct. 21-26, 2007, Joint Video Team of ISO/IEC and ITU-T SG 16.

Winken, M. et al "Bit-Depth Scalable Video Coding" Image Processing, IEEE International Conference Sep. 1, 2007, pp. i-5.

* cited by examiner

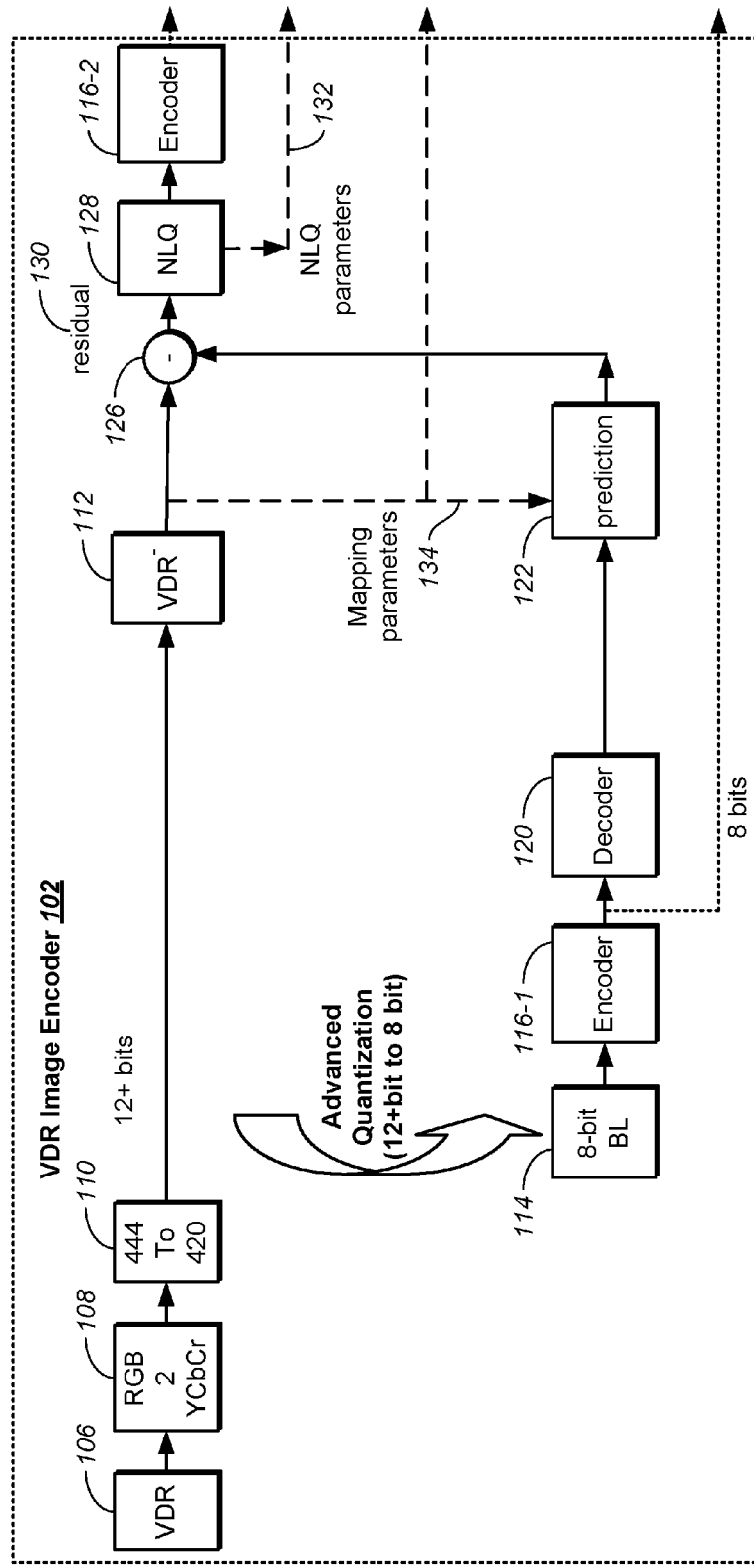

LAYER DECOMPOSITION IN HIERARCHICAL VDR CODING

CROSS-REFERENCE TO RELATED APPLICATIONS

This application is a continuation of U.S. patent application Ser. No. 14/351,647, filed on Apr. 14, 2014, which is the US national stage application for PCT Application Ser. No. PCT/US2012/062932, which claims priority to U.S. Provisional Patent Application No. 61/555,978 filed on Nov. 4, 2011, and U.S. Provisional Application No. 61/596,600 filed on Feb. 8, 2012, all of which are hereby incorporated by reference in their entirety.

TECHNOLOGY

The present invention relates generally to image processing, and in particular, to encoding, decoding, and representing variable dynamic range images using a hierarchical VDR codec.

BACKGROUND

Display technologies being developed by Dolby Laboratories, Inc., and others, are able to reproduce images having high dynamic range (HDR). Such displays can reproduce images that more faithfully represent real-world scenes than conventional displays.

To support backwards compatibility as well as new HDR display technologies, multiple layers may be used to deliver video data from an upstream device such as a multi-layer video encoder to downstream devices. Standard dynamic range (SDR) video data carried in a base layer (BL) of the multiple layers is optimized for viewing experience on SDR displays, while visual dynamic range (VDR) video data carried in the combination of the base layer and an enhancement layer (EL) of the multiple layers supports viewing experience of VDR displays having higher dynamic ranges than that of SDR displays. As used herein, codecs involved in encoding and decoding such image data are denoted as VDR codecs optimized for SDR displays.

BL image data may comprise lower bit depth (e.g., 8 bits per color component) SDR images derived from higher bit depth (e.g., 12 or more bits per color component) HDR source images from an image data input. The SDR images encoded in the BL image data typically comprise color-corrections by colorists to make the SDR images look as realistic as possible within a relatively narrow or standard dynamic range. For example, hue information related to some or all of the pixels in an input HDR image may be changed or corrected in an SDR image in order to create a realistic looking image within the standard dynamic range. These color corrections result in asymmetric clippings in various color channels, and introduce manual color alterations especially in relatively underexposed or overexposed regions of the HDR source images. The color corrected SDR image may allow SDR displays to show image details in the dark areas and highlights of an HDR source image.

Clipping is a type of color alternation that alters/modifies out-of-bound pixel values in color channels so that the resultant pixel values are within a target represented range (which may be one within a range supported by a specific type of SDR displays, or within a range supported by a range of SDR displays, or within a range supported by a range of VDR displays, etc.). Clipping may occur in zero, one or more of color channels (e.g., R, G, and B pixel values in a RGB color space in a certain portion of a HDR image may be clipped in a tone-mapped image). Amounts of clipping may or may not vary with the color channels (e.g., more clipping for green, less clipping for blue, etc.).

Color corrections, such as clipping, introduced into SDR images make the SDR images to comprise different and independently sourced image contents from their counterpart VDR images, and are difficult and even impossible to remove by a downstream device for the purpose of reconstructing high dynamic range images without complicated processing and without a sufficiently large bitrate. When multiple layers are used to transmit image data to a downstream device, reversing color corrections may require a large volume of additional image data to be transmitted, for example, in an enhancement layer, to the downstream device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A and FIG. 1B (FIG. 1) illustrate a visual dynamic range codec architecture in a baseline profile, in accordance with an example embodiment;

DESCRIPTION OF EXAMPLE EMBODIMENTS

Figure 1B:
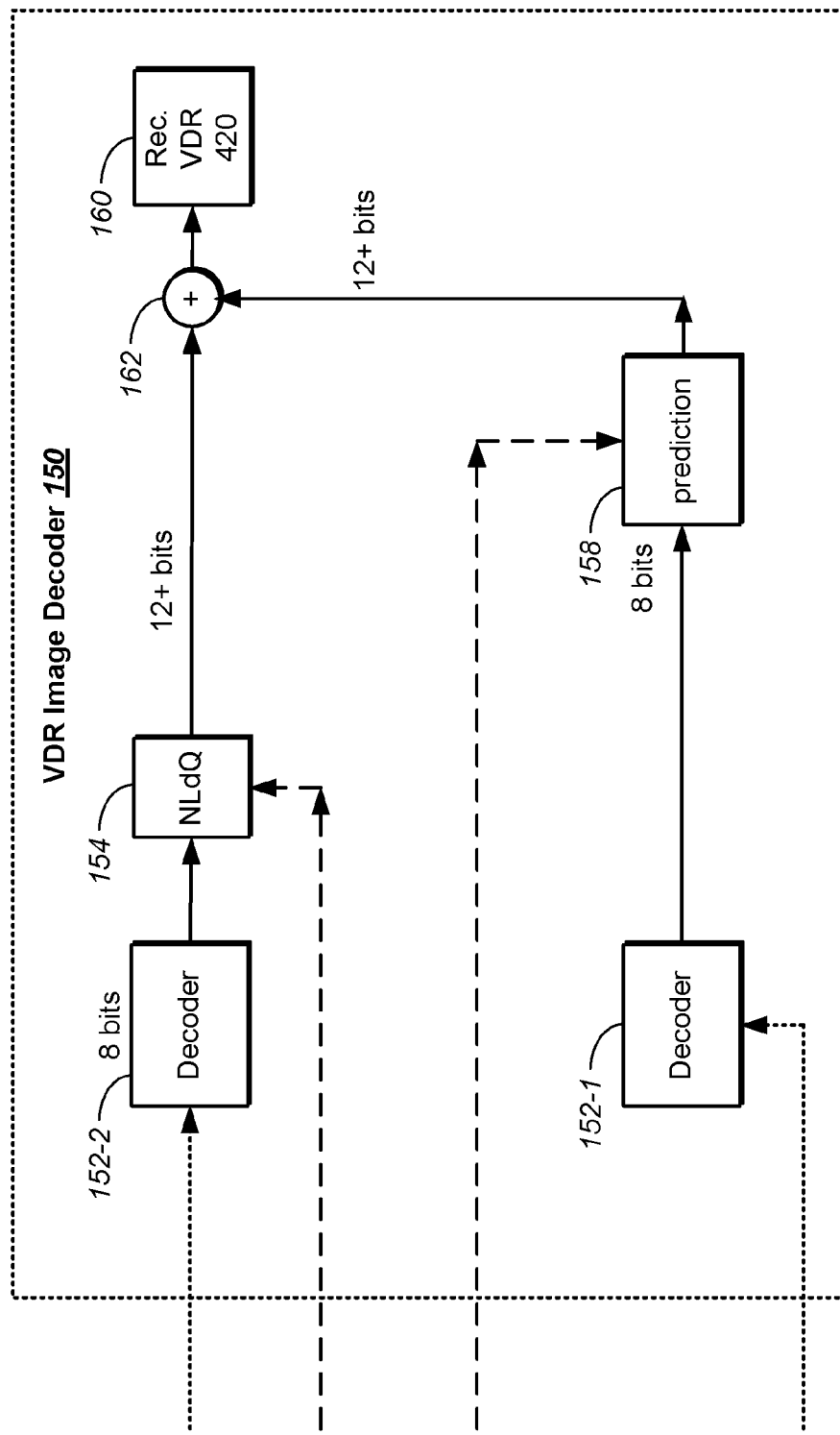

Example embodiments, which relate to encoding, decoding, and representing variable dynamic range images using a hierarchical VDR codec, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. HIERARCHICAL VIDEO DELIVERY
   2.1. BASELINE PROFILE
   2.2. MAIN PROFILE
3. ADVANCED QUANTIZATION
4. LINEAR STRETCHING
5. EXAMPLE PROCESS FLOWS
6. ADAPTIVE DYNAMIC RANGE ADJUSTMENT
7. IMPLEMENTATION MECHANISMS—HARDWARE OVERVIEW
8. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

In some embodiments, hierarchical VDR codecs may be used to provide compressed VDR images (e.g., video images) to VDR image processing devices (e.g., VDR displays). As used herein, the term "hierarchical VDR codec" may refer to a VDR codec wherein the base layer may not be viewed by itself on SDR displays. As used herein, the term "VDR" or "visual dynamic range" may refer to a dynamic range wider than a standard dynamic range, and may include, but is not limited to, a wide dynamic range up to the instantaneously perceivable dynamic range and color gamut which human vision can perceive at an instant.

A hierarchical VDR codec as described herein that supports higher bit depth (e.g., 12+ bits) VDR images may be implemented with two or more lower bit depth (e.g., 8 bits) codecs in multiple layers. The multiple layers may comprise a base layer and one or more enhancement layers.

In sharp contrast with other techniques, base layer image data under techniques as described herein is not to support optimized viewing on SDR displays, or to make SDR images to look as good as possible, matching human perceptual within a standard dynamic range. Instead, the base layer image data under techniques as described herein is to support optimized viewing on VDR displays. In an example embodiment, the base layer image data under techniques as described herein comprises a specific constitution of a lower-bit depth version of VDR image data and the remaining difference between base layer and the original VDR image is carried in the enhancement layer.

Also, under other techniques, VDR image data and SDR image data relating to the same source images comprise different image contents. For example, input SDR image data to an encoder comprises ad hoc independent alterations that are not known or determinable from input VDR image data to the encoder. Oftentimes, color corrections or results of color grading by a colorist must be forensically analyzed by comparing the SDR image data with the VDR image after the SDR image data has already been altered, for example, by the colorist.

In sharp contrast, under techniques as described herein, VDR image data may be used to derive base layer (BL) image data via hierarchical decomposition, e.g., advanced quantization followed by layered coding. Specific methods applied in the advanced quantization are known and even selected purposefully by a hierarchical VDR encoder. The selection/determination of a particular advanced quantizer to perform advanced quantization may be based on, for example, how the image quality of reconstructed VDR images may be on the VDR decoder side. Hence, advanced quantization under techniques as described herein is one or more operations known a priori (e.g., before the input uncompressed base layer data to base layer processing is produced), controlled, and implemented by a hierarchical VDR codec as described herein. Thus, complex analysis to determine differences between the VDR image data and the SDR image data which is independently altered or generated under other techniques can be avoided or disabled under techniques as described herein.

Codecs implementing techniques as described herein may be configured to include inter-layer prediction capabilities to fully exploit statistical redundancy between base layer (BL) image data and original input VDR image data. EL image data may (possibly only) carry residual (or differential) image data, instead of carrying a large amount of VDR image data without exploiting the statistical redundancy in image data of different layers.

In some embodiments, prediction may be used to further minimize the amount of VDR image data that is to be carried in the enhancement layers. As a specific application of advanced hierarchical VDR encoder, a corresponding relationship may be established by the hierarchical VDR encoder between advanced quantization and prediction. Based on the specific application of advanced quantization used to derive the input uncompressed base layer data to base layer processing, the hierarchical VDR encoder may select a specific corresponding prediction method among a plurality of available prediction methods. In an example, if linear quantization is used in the advanced quantization, a first order polynomial based prediction method may be used for prediction. In another example, if a quantization curve (e.g., Sigmoid curve, mu-law, a human-perceptual based curve, etc.) is used in the advanced quantization, a higher-order (second order or higher) polynomial based prediction method that corresponds to the quantization curve may be used for prediction. In another example, if a cross-color (vector) channel quantization (e.g., slope/offset/power/hue/saturation used in primary color grading operation) is used in the advanced quantization, a corresponding cross-color channel prediction may be used for prediction. In yet another example, if a piecewise quantization is used in the advanced quantization, a prediction method corresponding to the piecewise quantization may be used for prediction. A corresponding prediction method may be preconfigured or dynamically selected by the hierarchical VDR encoder, since the hierarchical VDR encoder knows in advance (e.g., without analyzing the result of the advanced quantization) whether, and which specific type of, e.g., a linear quantization, a curved quantization, a cross-color channel quantization, a piecewise quantization, a look up table (LUT) based quantization, a specific combination of different types of quantizations, etc., is used in the advanced quantization.

In sharp contrast, under other techniques, as color corrections to the input SDR image data in a base layer, such as those made by a colorist, are independently performed, it is difficult to determine which method should be applied for prediction without expensive comparison and analysis processing over independently differing image contents of both the input SDR image data in the base layer and the input VDR image data.

Thus, in some embodiments, complex and expensive analysis (e.g., in prediction operations) to determine differences in VDR and independently altered input base layer contents may be disabled or avoided under techniques as described herein. A hierarchical VDR codec may implement advanced quantization and processing logic to correlate the advanced quantization with prediction.

In some embodiments, even though a hierarchical VDR codec is not designed to provide base layer image data optimized for viewing in SDR displays, the hierarchical VDR codec may still extensively reuse components in a VDR codec with base layer optimization. In an embodiment, a hierarchical VDR encoder may add one or more modules to, or modify one or more modules in, a VDR codec infrastructure optimized for SDR displays to generate input base layer image via advanced quantization to base layer processing from input VDR image data. Thus, the hierarchical VDR encoder may need only a single input of image content from the input VDR image data rather than one input of image content for VDR and another input of differing image content for SDR. For example, a conversion module in the hierarchical VDR encoder may implement advanced quantization to convert input 16 bit RGB VDR data to 8 bit YCbCr as input base layer image data to base layer processing.

In an example embodiment, a hierarchical VDR codec may be configured to extensively support the VDR reference processing syntax, specification, and coding architecture, as defined, for example, in an industry standard, a proprietary specification, an extension from an industry standard, or a combination of the foregoing. In an example embodiment, one or more of inputs and outputs of the hierarchical VDR codec (encoder and/or decoder) are the same as, or substantially similar to, those specified by the VDR specification or profiles for a VDR codec optimized for SDR displays. A hierarchical VDR codec may be a vehicle to process and render 12+ bits VDR images via two (inexpensive) 8 bit decoders, obviating a need to use an expensive 12+ bit decoder to provide perceptually similar image quality for VDR images. As used herein, the term "N+ bit image" may refer to images that are represented using N bits or more per color component and have at least one color component. In some embodiments, more than one lower bit depth decoder in a codec and/or more than one lower bit depth encoder may work in parallel at least for some operations and jointly perform encoding and decoding of VDR image data in a device.

Practical benefits of the embodiments described herein include, but are not limited only to, providing high quality VDR image data to end consumers who only care about the final VDR quality and do not care or even look at the SDR version that might be constructed from base layer image data.

In some embodiments, a combined codec (which may be a VDR encoder or a VDR decoder) may be used to operate in multiple modes. One of the operational modes for the combined codec may place the combined codec to operate as a hierarchical VDR codec, whereas a different one of the operational modes for the combined codec may also allow for encoding a base layer that is suitable to be viewed on SDR displays. As a result, in some example embodiments, coded bitstreams that comply with either of the VDR specifications may be properly decoded by the combined VDR decoder. As a result, in some example embodiments, coded bitstreams that comply with either of the VDR specifications may be properly generated by the combined VDR encoder.

In some example embodiments, data needed for other applications may also be included with base layer and enhancement layer image data to be delivered from an upstream device to a downstream device. In some example embodiments, additional features and/or orthogonal features may be supported by the base and enhancement layers as described herein.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. HIERARCHICAL VIDEO DELIVERY

In some embodiments, a base layer and one or more enhancement layers may be used, for example by an upstream device (e.g., a VDR image encoder 102 of FIG. 1A or a VDR image encoder 202 of FIG. 2A), to deliver image data in one or more video signals (or coded bitstreams) to a downstream device (e.g., a VDR image decoder 150 of FIG. 1B). The image data may comprise base layer image data of a lower bit depth quantized from a higher bit depth (e.g., 12+ bits) VDR image and carried in a base layer image container (a YCbCr 4:2:0 image container), and enhancement layer image data comprising residual values between the VDR image and a prediction frame generated from the base layer image data. The base layer image data and the enhancement layer image data may be received and used by the downstream device to reconstruct a higher bit depth (12+ bits) version of the VDR image.

In some embodiments, the base layer image data is not for producing a SDR image optimized for viewing on SDR displays; instead, the base layer image data, together with the enhancement layer image data, is optimized for reconstructing high quality VDR images for viewing on VDR displays.

2.1. Baseline Profile

FIG. 1A and FIG. 1B show a VDR codec architecture in a baseline profile, in accordance with an example embodiment. As used herein, the term baseline profile may refer to the simplest encoder profile in a VDR coding system. In an embodiment, baseline profile restricts all video processing in the base and enhancement coding layers in the YCbCr 4:2:0 color space. In an example embodiment, prediction may be made with an YCbCr space under a 4:2:0 sampling scheme; a polynomial/1D LUT prediction method, for example, may be used for prediction. In some embodiments, an upstream device that delivers VDR image data to downstream devices may comprise a VDR image encoder 102 implementing one or more techniques as described herein, while a downstream device that receives and processes video signals from the VDR image encoder 102 may comprise a VDR image decoder 150 implementing one or more techniques as described herein. Each of the VDR image encoder 102 and the VDR image decoder 150 may be implemented by one or more computing devices.

In an example embodiment, the VDR image encoder (102) is configured to receive an input VDR image (106). As used herein, an "input VDR image" refers to wide or high dynamic range image data that may be used to derive a VDR version of a source image (e.g., raw image captured by a high-end image acquisition device, etc.), which gives rise to the input VDR image. The input VDR image may be in any color space that supports a high dynamic range color gamut. In some embodiments, the input VDR image (106) is the only input, relative to the source image, that provides image data for the VDR image encoder (102) to encode; input image data, relative to the source image, for base layer processing under techniques as described herein may be generated based on the input VDR image (106) using advanced quantization.

In an example embodiment, the input VDR image is a 12+ bit RGB image in an RGB color space, as illustrated in FIG. 1A. In an example, each pixel represented in the input VDR image comprises pixel values for all channels (e.g., red, green, and blue color channels) defined for a color space (e.g., a RGB color space). Each pixel may optionally and/or alternatively comprise upsampled or downsampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

In an example embodiment, the VDR image encoder (102) is configured to transform pixel values of the input VDR image from a first color space (e.g., a RGB color space) to a second color space (e.g., an YCbCr color space). The color space transformation may be performed, for example, by a RGB-2-YCbCr unit (108) in the VDR image encoder (102).

In an example embodiment, the VDR image encoder (102), or a downsampler (e.g., a 444-420 downsampler 110) therein, is configured to downsample the VDR image (e.g., in a 4:4:4 sampling format) in the YCbCr color space into a 12+ bit downsampled VDR image 112 (e.g., in a 4:2:0 sampling format). Without considering the effects of compression, the total amount of image data in a chroma channel of the 12 bit+ downsampled VDR image (112) may be one quarter in size of the total amount of image data in a luminance channel of the 12 bit+ downsampled VDR image (112).

In an example embodiment, the VDR image encoder (102) is configured to perform advanced quantization on YCbCr image data (in the 4:2:0 sampling format in the present example), as downsampled from the VDR image (in the 4:4:4 sampling format), to generate an 8 bit BL image (114) in the YCbCr color space. As illustrated in FIG. 1A, both the 12+ bit VDR image (112) and the 8 bit BL image (114) are generated after the same chroma downsampling and hence contain the same image content (e.g., the 8 bit BL image 114 being more coarsely quantized than the 12+ bit VDR image 112).

In an example embodiment, the VDR image encoder (102), or a first encoder (116-1) therein, is configured to encode/format the 8 bit BL image (214) in the YCbCr color space into image data into a base layer image container in the 4:2:0 sampling format. In some embodiments, the image data in the base layer image container is not for producing SDR images optimized for viewing on SDR displays; rather, the image data in the base layer image container is optimized to contain an optimal amount of base layer image data in a lower bit depth image container for the purpose of minimizing an overall bit requirement for VDR image data to be carried in multiple layer to be reconstructed into a VDR image optimized for VDR displays. As used herein, the term "a lower bit depth" refers to image data quantized in a coding space that is with the lower bit depth; an example of lower bit depth comprises 8 bits, while the term "a higher bit depth" refers to image data quantized in a coding space that is with the higher bit depth; an example of higher bit depth is 12 bits or more. In particular, the term "a lower bit depth" or "a higher bit depth" does not refer to least significant bits or most significant bits of a pixel value.

In an example embodiment, the VDR image encoder (102) generates, based on the image data in the base layer image container, a base layer video signal, which may be outputted to a vide decoder (e.g., the VDR image decoder 150, or a first decoder 152-1 therein) in a downstream device.

In an example embodiment, a decoder (120) in the VDR image encoder (102) decodes the image data in the base layer image container into a decoded base layer image in the 4:2:0 sampling format in the present example. The decoded base layer image is different from the 8 bit BL image (114), as the decoded base layer image comprises coding changes, rounding errors and approximations introduced in the encoding and decoding operations performed by the first encoder (116-1) and the decoder (120).

VDR image reconstruction data, in addition to what is contained in the base layer video signal, may be delivered by the VDR image encoder to a downstream device in one or more enhancement layers separate from the base layer. In some embodiments, the higher bit depth VDR image (112) in the YCbCr color space may be predicted either from neighboring samples in the same image frame (using intra prediction) or from samples from past decoded image frames (inter prediction) that belong to the same layer and are buffered as motion-compensated prediction references within a prediction image frame buffer. Inter-layer prediction may also be at least in part based on decoded information from other layers (e.g., the base layer).

In an example embodiment, the VDR image encoder (102) comprises a prediction processing unit (122) that performs one or more operations relating to prediction. Prediction as implemented by a prediction processing unit (e.g., 122) may reduce the overhead in reconstructing a VDR image by a VDR video decoder (e.g., 150 of FIG. 1B). In an example embodiment, the VDR image encoder (102) is configured to determine, based at least in part on the 12+ bit VDR image (112) and the decoded base layer image, through intra or inter prediction (or estimation, or other methods), a set of mapping parameters for prediction (134). The prediction processing unit (122) may generate a 12+ bit prediction image in the YCbCr color space based on the set of mapping parameters (134) and the decoded base layer image. As used herein, examples of mapping parameters may include, but are limited only to, polynomial parameters used for prediction.

In an example embodiment, the VDR image encoder (102) is configured to generate residual values (130) between the 12+ bit VDR image (112) and the prediction image generated by the prediction processing unit (122).

Residual values in a color channel (e.g., luminance channel) may be differences produced by subtraction operations (e.g., 126) in a linear or logarithmic domain. Alternatively and/or optionally, residual values in a color channel (e.g., luminance channel) may be ratios produced by division operations in a linear or logarithmic domain. In various example embodiments, one or more other mathematical representations and corresponding operations may be used for the purpose of generating residual values (130) between the 12+ bit VDR image (112) and the prediction image.

In an embodiment, other than differences introduced by advanced quantization (or pseudo color grading process), the 12+ bit VDR image (112) and the 8 bit BL image (114) comprise the same image content. In an embodiment, the 12+ bit VDR image (112) comprises the same chroma information as the 8 bit BL image (114), other than quantization noises or differences introduced by introduced by advanced quantization (or pseudo color grading process). In an embodiment, midtone and dark areas in the 12+ bit image (112) may be encoded in the base layer under the advanced quantization, while highlight areas in the 12+ bit image (112) may be encoded in the enhancement layers under the same advanced quantization.

Additionally and/or optionally, no color correction/alterations/distortion (e.g., clipping) is introduced into only base layer processing by the first encoding unit (116-1), the decoding unit (120), or the prediction processing unit (122) in a processing path from the 8 bit BL image (114) to the prediction image. In an example embodiment, the prediction image comprises the same chroma information as the 8 bit BL image (114), except for possible distortions that may be inherently present in the processing path (e.g., base layer distortions caused by the base layer codec).

In an example embodiment, a non-linear quantizer (NLQ) 128 in the VDR image encoder (102) is configured to quantize the residual values (130) in a 12+ bit digital representation to an 8 bit digital representation (or 8 bit residual values in the YCbCr color space) using one or more NLQ parameters.

In an example embodiment, the VDR image encoder (102), or a second encoder (116-2) therein, is configured to encode the 8 bit residual values in an enhancement layer image container, e.g., in the 4:2:0 sampling format. The enhancement layer image container is logically separate from the base layer image container in the base layer.

In an example embodiment, the VDR image encoder (102) generates, based on the 8 bit residual values in the enhancement layer image container, an enhancement layer video signal, which may be outputted to a video decoder (e.g., the VDR image decoder 150, or a second decoder 152-2 therein).

In an example embodiment, the set of mapping parameters (134) and the NLQ parameters (132) may be transmitted to a downstream device (e.g., the VDR image decoder 150) as a part of supplemental enhancement information (SEI) or other similar metadata carriages available in video bitstreams (e.g., in the enhancement layers).

One or more of the first encoder (116-1), the second encoder (116-2), and the decoder (120) (and 152-1, 152-2) may be implemented using one or more of a plurality of codecs, such as H.264/AVC/HEVC, MPEG-2, VP8, VC-1, and/or others.

In an example embodiment, the VDR image decoder (150) is configured to receive input video signals in multiple layers (or multiple bitstreams) comprising a base layer and one or more enhancement layers. As used herein, the term "multi-layer" or "multiple layers" may refer to two or more bitstreams that carry video or image signals having one or more logical dependency relationships between one another (of the video signals).

In an example embodiment, a first decoder (152-1) in the VDR image decoder (150) is configured to generate, based on a base layer video signal, a decoded base layer image. In some embodiments, the first decoder (152-1) in the VDR image decoder (150) may be the same, or substantially similar to, the decoder (120) in the VDR image decoder (102). Likewise, the decoded base layer image in the VDR image decoder (150) and the decoded base layer image may be the same, or substantially similar, provided that the decoded base layer images are sourced from the same VDR image (e.g., 106).

In an example embodiment, the VDR video decoder (150) comprises a prediction processing unit (158) that performs one or more operations relating to prediction. Prediction as implemented by a prediction processing unit may be used to efficiently reconstruct VDR images in a VDR video decoder (e.g., 150 of FIG. 1B). The prediction processing unit (158) is configured to receive the set of mapping parameters (134) and to generate, based at least in part on the set of mapping parameters (134) and the decoded base layer image, a 12+ bit prediction image.

In an example embodiment, a second decoder (152-2) in the VDR image decoder (150) is configured to retrieve, based on one or more enhancement video signals, 8 bit residual values in an enhancement layer image container.

In an example embodiment, a non-linear dequantizer (NLdQ) 154 in the VDR image decoder (150) is configured to receive one or more NLQ parameters through the enhancement layers and to dequantize the 8 bit residual values to a 12+ bit digital representation (or 12+ bit residual values in the YCbCr color space) using the one or more NLQ parameters.

In an example embodiment, the VDR image decoder (150) is configured to generate a reconstructed VDR image (160) based on the 12+ bit residual values (130) and the 12+ bit prediction image generated by the prediction processing unit (158). Reconstructed pixel values in a color channel (e.g., luminance channel) may be sums produced by addition operations (e.g., 162) in a linear or logarithmic domain. Alternatively and/or optionally, reconstructed values in a color channel (e.g., luminance channel) may be products produced by multiplication operations in a linear or logarithmic domain. In various example embodiments, one or more other mathematical representations and corresponding operations may be used for the purpose of generating reconstructed pixel values (160) from the residual values and the prediction image.

2.2. Main Profile

Figures 2, 2A:
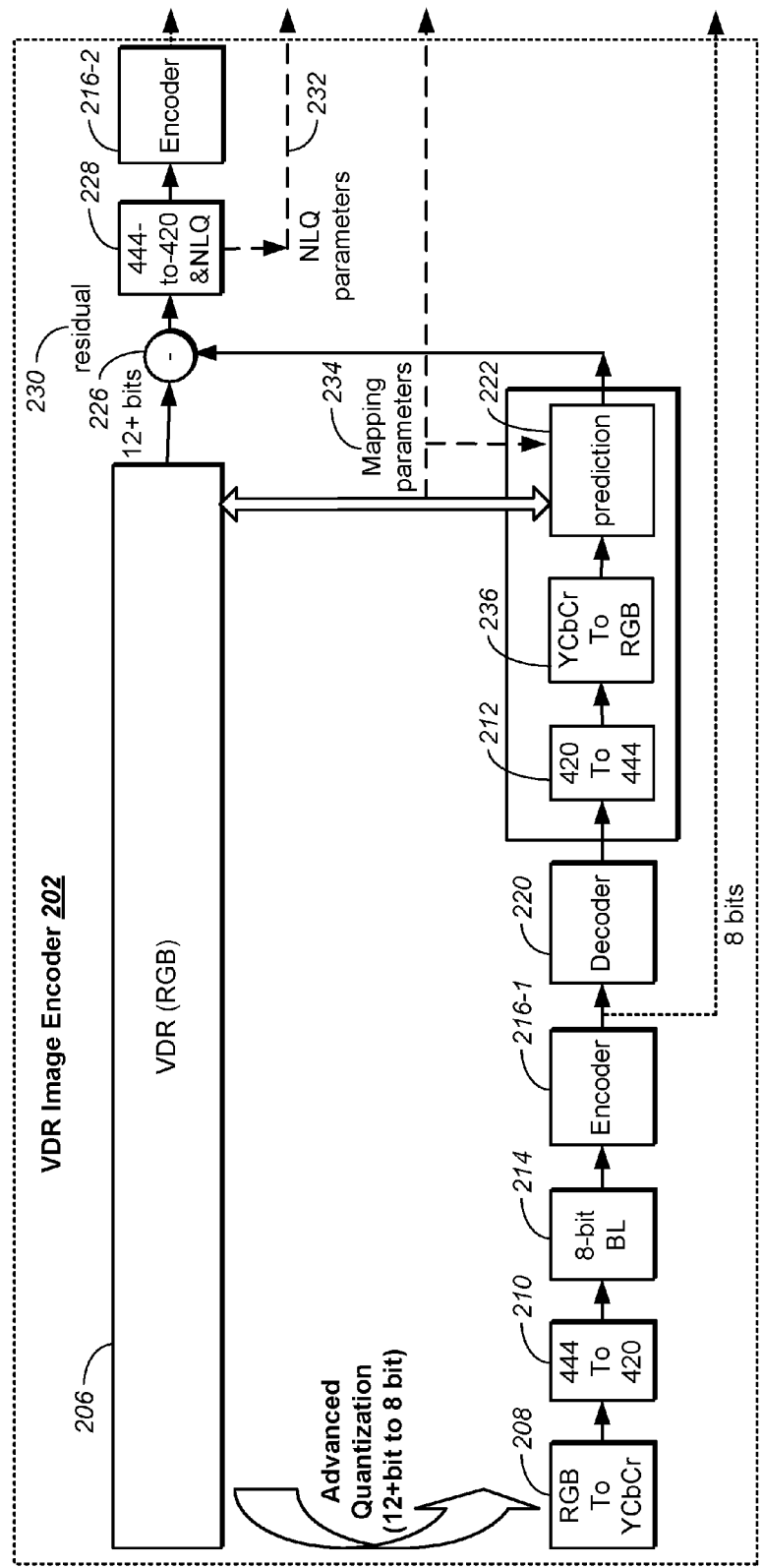
FIG. 2A and FIG. 2B (FIG. 2) illustrates a visual dynamic range codec architecture in a main profile, in accordance with an example embodiment.
Figure 2B:
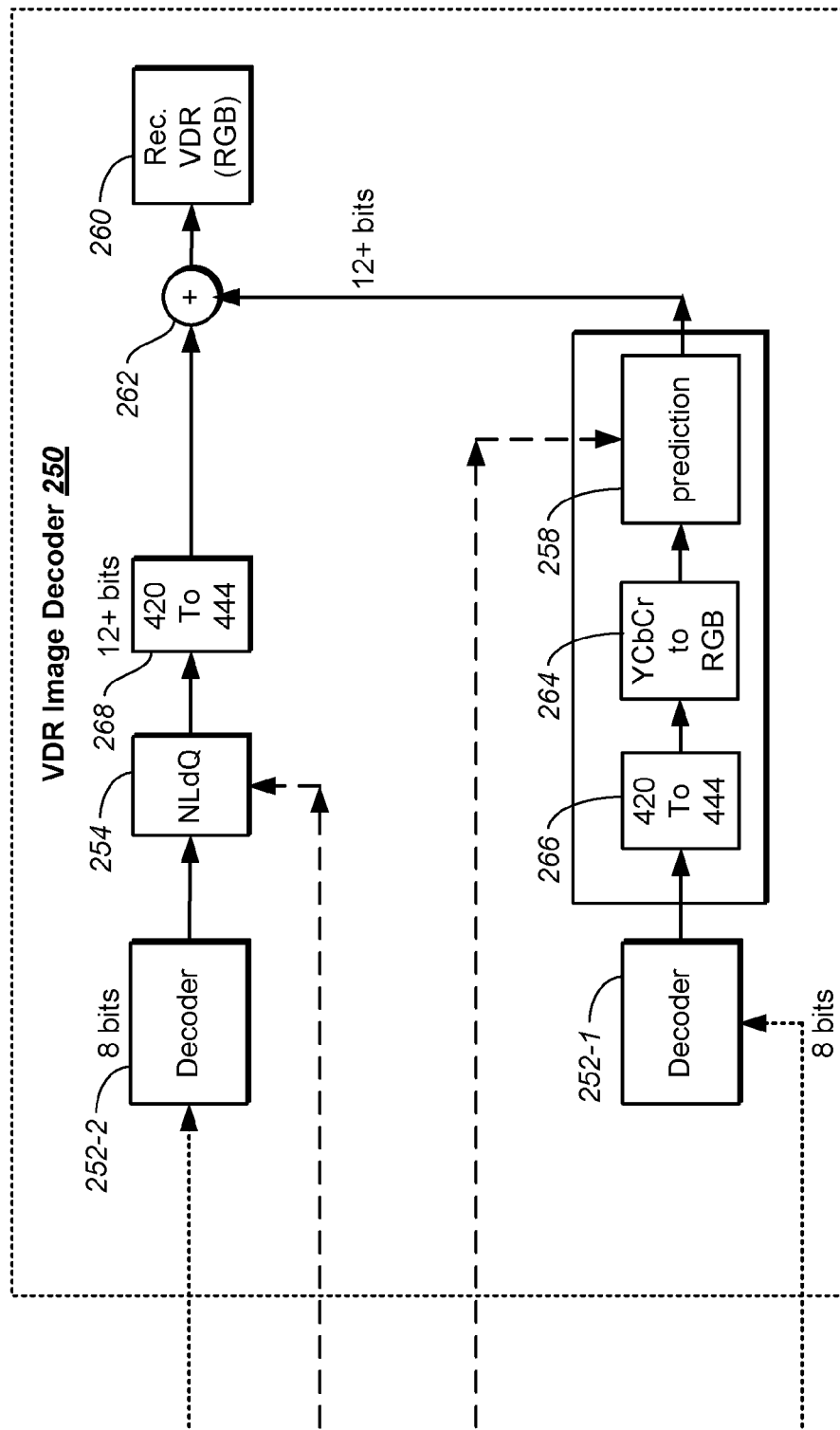

FIG. 2A and FIG. 2B illustrate a VDR codec architecture in a main profile, in accordance with an example embodiment. As used herein, the term main profile may refer to a profile that allows more complexity than the baseline profile in a VDR coding system. For example, the main profile may allow operations in both the YCbCr or RGB color spaces and it may also allow operations in a variety of sub-sampling formats, including: 4:2:0, 4:2:2, and 4:4:4. In an example embodiment, predictions may be made in a RGB color space under a 4:4:4 sampling scheme; a polynomial/1D LUT prediction method, for example, may be used for prediction. In some embodiments, an upstream device that delivers VDR image data to downstream devices may comprise a VDR image encoder 202 as illustrated in FIG. 2A, while a downstream device that receives and processes the VDR image data may comprise a VDR image decoder 250. Each of the VDR image encoder 202 and the VDR image decoder 250 may be implemented by one or more computing devices.

In an example embodiment, the VDR image encoder (202) is configured to receive an input VDR image (206). The input VDR image (206) may be in any color space that supports a high dynamic range color gamut.

In an example embodiment, the input VDR image is a 12+ bit RGB image in an RGB color space, as illustrated in FIG. 2A. In an example, each pixel in the input VDR image comprises pixel values for red, green, and blue color channels defined in the RGB color space. Each pixel may optionally and/or alternatively comprise upsampled or downsampled pixel values for one or more of the channels in the color space.

In an example embodiment, the VDR image encoder (202) is configured to perform advanced quantization on 12+ bit RGB image data in the VDR image 206 (in a 4:4:4 sampling format in the present example) to generate 8 bit RGB VDR data.

In an example embodiment, the VDR image encoder (202) is configured to transform the 8 bit RGB VDR data from a first color space (the RGB color space in the present example) to a second color space (e.g., an YCbCr color space). The color space transformation may be performed, for example, by a RGB-2-YCbCr unit (208) in the VDR image encoder (202).

In an example embodiment, the VDR image encoder (202), or a downsampler (e.g., a 444-420 downsampler 210) therein, is configured to downsample the 8 bit VDR data in the YCbCr color space into an 8 bit downsampled BL image 214 (e.g., in a 4:2:0 sampling format).

In an example embodiment, the VDR image encoder (202), or a first encoder (216-1) therein, is configured to encode the 8 bit downsampled BL image (214) into image data in a base layer image container. In an example embodiment, the image data in the base layer image container is not optimized for viewing on SDR displays; rather, the image data in the base layer image container is optimized to contain the maximal amount of reconstructable information to represent the higher bit depth VDR image data in a lower bit depth image container and to minimize the amount of VDR image reconstruction data (e.g., residual values 230) that needs to be carried in the enhancement layers.

In an example embodiment, the VDR image encoder (202) generates, based on the image data in the base layer image container, a base layer video signal, which may be outputted to a video decoder (e.g., the VDR image decoder 250, or a first decoder 252-1 therein) in a downstream device.

In an example embodiment, a decoder (220) in the VDR image encoder (202) decodes the image data in the base layer image container into a decoded base layer image in the 4:2:0 sampling format in the present example. The decoded base layer image is different from the 8 bit BL image (214), as the decoded base layer image comprise changes and errors, such as rounding errors and approximations, introduced in the encoding and decoding operations performed by the first encoder (216-1) and the decoder (220).

VDR image reconstruction data in addition to the base layer video signal may be delivered by the VDR image encoder to a downstream device in one or more enhancement layers separate from the base layer. The VDR image (206) in the RGB color space may be predicted either from neighboring samples in the same image frame (using intra prediction) or from samples from past decoded image frames (inter prediction) that belong to the same layer and are buffered as motion-compensated prediction references within a prediction image frame buffer. Inter-layer prediction may also be at least in part based on decoded information from other layers (e.g., the base layer).

In an example embodiment, the VDR image encoder (202), or an upsampler (e.g., a 420-444 upsampler 212) therein, is configured to upsample the decoded base layer image in the 4:2:0 sampling format into 8 bit upsampled image data (in the 4:4:4 sampling format in the present example).

In an example embodiment, the VDR image encoder (202), or an YCbCr-2-RGB unit (e.g., 236) therein, is configured to transform the 8 bit upsampled image data from a non-prediction color space (the YCbCr color space in the present example) to a prediction color space (e.g., the RGB color space).

In an example embodiment, the VDR image encoder (202) comprises a prediction processing unit (222) that performs one or more operations relating to prediction. Prediction as implemented by a prediction processing unit (e.g., 222) may reduce the overhead in reconstructing a VDR image by a VDR video decoder (e.g., 250 of FIG. 2B).

In an example embodiment, the VDR image encoder (202) is configured to determine based at least in part on the 12+ bit VDR image (206) and the upsampled image data as transformed to the prediction color space, through intra or inter prediction (or estimation, or other methods), a set of mapping parameters (234) for prediction. The prediction processing unit (222) may generate, based on the set of mapping parameters (234) and the upsampled image data as transformed to the prediction color space, a 12+ bit prediction image in the RGB color space.

In an example embodiment, the VDR image encoder (202) is configured to generate (RGB) residual values (230) between the 12+ bit VDR image (206) and the prediction image. Residual values in a color channel (e.g., G channel) may be differences produced by subtraction operations (e.g., 126) in a linear or logarithmic domain. Alternatively and/or optionally, residual values in a color channel (e.g., G channel) may be ratios produced by division operations in a linear or logarithmic domain. In various example embodiments, other mathematical representations and corresponding operations/mappings/functions may be used for the purpose of generating residual values (230) between the 12+ bit VDR image (206) and the prediction image.

In an embodiment, the 12+ bit VDR image (206) comprises the same chroma information as the 8 bit RGB VDR data, except for quantization differences or noises introduced by the advanced quantization (or pseudo color grading process). In an embodiment, midtone and dark areas in the 12+ bit VDR image (206) may be encoded in the base layer under the advanced quantization, while highlight areas in the 12+ bit VDR image (206) may be encoded in the enhancement layers under the same advanced quantization.

In an example embodiment, no extra color correction/alterations/distortions (e.g., clipping) is introduced by the RGB-2-YCbCr unit (208), the downsampler (210), the first encoding unit (216-1), the decoding unit (220), the upsampler (212), the YCbCr-2-RGB unit (236), or the prediction processing unit (222) in a processing path from the 8 bit RGB VDR data to the prediction image. In an example embodiment, the prediction image comprises the same chroma information as the 8 bit RGB VDR data, except for possible distortions that may be inherently present in the processing path (e.g., base layer distortions caused by the base layer codec, or errors from chroma reformatting in downsampling and upsampling).

In an example embodiment, a 444-to-420 downsampling and non-linear quantization unit (444-to-420& NLQ) 228 in the VDR image encoder (202) is configured to downsample and to quantize the residual values (230) from a 12+ bit digital representation in the 4:4:4 sampling format to an 8 bit digital representation (or 8 bit RGB residual values) in the 4:2:0 sampling format using one or more NLQ parameters.

In an example embodiment, the VDR image encoder (202), or a second encoder (216-2) therein, is configured to encode the 8 bit residual values in an enhancement layer image container. The enhancement layer image container is logically separate from the base layer image container.

In an example embodiment, the VDR image encoder (202) generates, based on the 8 bit residual values in the enhancement layer image container, an enhancement layer video signal, which may be outputted to a video decoder (e.g., the VDR image decoder 250, or a second decoder 252-2 therein).

In an example embodiment, the set of mapping parameters (234) and the NLQ parameters (232) may be transmitted to a downstream device (e.g., the VDR image decoder 250) as a part of supplemental enhancement information (SEI) or other similar metadata carriages available in video bitstreams (e.g., in the enhancement layers).

One or more of the first encoder (216-1), the second encoder (216-2), and the decoder (220) (252-1 and 252-2) may be implemented using one or more of a plurality of codecs, such as H.264/AVC/HEVC, MPEG2, VP8, VC-1, and/or others.

In an example embodiment, the VDR image decoder (250) is configured to receive input video signals in multiple layers (or multiple bitstreams) comprising a base layer and one or more enhancement layers.

In an example embodiment, a first decoder (252-1) in the VDR image decoder (250) is configured to generate, based on a base layer video signal, a decoded (YCbCr) base layer image. In some embodiments, the first decoder (252-1) in the VDR image decoder (250) may be the same, or substantially similar to, the decoder (220) in the VDR image decoder (202). Likewise, the decoded base layer image in the VDR image decoder (250) and the decoded base layer image may be the same, or substantially similar, provided that the decoded base layer images are sourced from the same VDR image (e.g., 206).

In an example embodiment, the VDR image decoder (250), or an upsampler (e.g., a 444-420 downsampler 266) therein, is configured to upsample the decoded base layer image in a 4:2:0 sampling format into 8 bit upsampled image data in the 4:4:4 sampling format in the present example.

In an example embodiment, the VDR image decoder (250), or an RGB-2-YCbCr unit (e.g., 264) therein, is configured to transform the 8 bit upsampled image data from a non-prediction color space (the YCbCr color space in the present example) to a prediction color space (e.g., the RGB color space).

In an example embodiment, the VDR video decoder (250) comprises a prediction processing unit (258) that performs one or more operations relating to prediction. Prediction as implemented by a prediction processing unit may be used to efficiently reconstruct VDR images in a VDR video decoder (e.g., 250 of FIG. 2B). The prediction processing unit (258) is configured to receive the set of mapping parameters (234) and to generate, based at least in part on the set of mapping parameters (234) and the 8 bit upsampled image data in the prediction color space, a 12+ bit prediction image.

In an example embodiment, a second decoder (252-2) in the VDR image decoder (250) is configured to retrieve, based on one or more enhancement video signals, 8 bit (RGB) residual values in an enhancement layer image container.

In an example embodiment, a non-linear dequantizer (NLdQ) 254 in the VDR image decoder (250) and a 420-to-444 upsampler (268) are configured to receive one or more NLQ parameters through the enhancement layers and to dequantize and to upsample the 8 bit residual values in the 4:2:0 sampling format to a 12+ bit digital representation (or 12+ bit residual values in the RGB color space) in the 4:4:4 sampling format using the one or more NLQ parameters.

In an example embodiment, the VDR image decoder (250) is configured to generate a reconstructed VDR image (260) based on the 12+ bit residual values (230) and the 12+ bit prediction image generated by the prediction processing unit (258). Reconstructed pixel values in a color channel (e.g., G channel) may be sums produced by addition operations (e.g., 262) in a linear or logarithmic domain. Alternatively and/or optionally, reconstructed values in a color channel (e.g., G channel) may be products produced by multiplication operations in a linear or logarithmic domain. In various example embodiments, other mathematical representations and corresponding operations/functions/mappings may be used for the purpose of generating reconstructed pixel values (260) from the residual values and the prediction image.

Additionally and/or optionally, one or more of transform, quantization, entropy coding, image buffering, sample filtering, down-sampling, upsampling, interpolation, multiplexing, demultiplexing, interleaving, upscaling, downscaling, motion-compensating, disparity estimation, disparity compensation, depth estimation, depth compensation, encoding, decoding, etc., may be performed by a video encoder or decoder as described herein.

3. ADVANCED QUANTIZATION

In some embodiments, advanced quantization such as performed by the VDR image encoder (102 of FIG. 1A or 202 of FIG. 2A) is designed and implemented to capture/preserve as many image details as possible in the base layer. This minimizes the amount of residual values (e.g., 130 of FIG. 1A or 230 of FIG. 2A) that needs to be encoded into an enhancement layer video signal. Furthermore, the image details captured/preserved in the base layer lend support in efficiently reconstructing VDR images by a downstream device such as a VDR image decoder (e.g., 150). The presence of accurate image details alleviates/reduces/removes visual artifacts that would otherwise be generated/amplified during lossy compression operations.

As discussed, unlike a base layer SDR image, optimized for SDR displays, generated by other techniques, a decoded base layer image under techniques as described herein is not for viewing on SDR displays. Rather, a decoded base layer image under techniques as described herein serves as intermediate image data for further generating residual values in a VDR image encoder and for further reconstructing higher bit depth VDR images in a VDR image decoder.

Under techniques as described herein, a color grading process designed for producing best viewing experience on SDR displays is not needed and may be disabled or avoided. External- or user-controlled color corrections that cause asymmetric (or different) clipping in the enhancement layer processing path and base layer processing path are avoided or disabled. Clipping levels in both enhancement layer and base layer processing paths are fully controlled by a VDR image encoder under techniques as described herein. Pixels that are color clipped in the base layer image data may also be color clipped in the enhancement layer image data.

Techniques as described herein may be used to reduce computation complexity for prediction including inter-layer prediction involving SDR image data in the base layer and VDR image data in the enhancement layers and are System-on-Chip (SoC) friendly. For example, a prediction process as described herein may be implemented as an inverse of advanced quantization (or pseudo color grading) as described herein. As the advanced quantization may be fully controlled by a VDR image encoder as described herein, the prediction process may also be fully controlled. In some embodiments, clipping levels and pixels with color clippings may be fully controlled in the enhancement layer processing path and base layer processing path so that a computationally efficient prediction method such as a first order polynomial mapping may be sufficient for generating and reconstructing prediction images.

In an example embodiment, higher bit depths (e.g., 16-bit) VDR data is directly quantized in advanced quantization (e.g., in FIG. 1A and FIG. 2A) into lower bit depths (8-bit) base layer image data via a linear quantizer.

In some example embodiments, one or more of linear or non-linear quantizers may be used to quantize higher bit depth (e.g., 12+ bits) image data to lower bit depth (e.g., 8 bits) image data. Different quantizers in different color spaces and/or in different color channels may be selected. For example, to alleviate/reduce/remove contouring artifacts (e.g., in smooth areas) and other artifacts, video signals may be quantized in different color spaces and/or with different advanced quantization methods. In some embodiments, advanced quantization as described herein may comprise one or more of linear quantization; linear stretching, curve-based/non-uniform quantization; probability-density-function (Pdf) optimized quantization (for example, LLoyd-Max quantization) based on histograms for a frame, multiple frames, a scene, multiple scenes, or one or more partitions within a frame, etc.; perceptual quantization; a vector quantization; any combination of the foregoing (e.g., perceptual quantization followed by Pdf-optimized quantization in a perceptual space). In some embodiments, a specific type of advanced quantization may have a corresponding relationship with one or more types of prediction methods. For example, when uniform quantization is applied as advanced quantization, a corresponding type of prediction method used in prediction may be based on a first order polynomial.

Quantization may be performed on an individual channel basis or on two or more channels at the same time. In an example embodiment, vector quantization may be performed across two or more color channels. For example, a coordinate system (e.g., 3D Cartesian) may be setup using color channels in a color space as axes. Spatial transformation such as rotation may be performed in the coordinate system to create new axes that are defined as combinations (or sums of projections) of the two or more color channels in the color space. Pixel values in the two or more color channels as projected to form one of the new axes may be quantized together by a quantizer over the one of the new axes.

In some embodiments, a specific advanced quantization method may be selected based on how well it can compress output multi-layer VDR image data while still maintaining high perceptual quality with the compressed output VDR image data on the VDR decoder side.

In some embodiments, a specific advanced quantization method may be selected to compensate weaknesses of codecs. For example, a codec may not perform well in compressing black areas, and may even output contouring artifacts in a reconstructed VDR image. Advanced quantization as described herein may use a specific curve (e.g., Sigmoid curve, mu-law, a human-perceptual based curve, etc.) to generate image data with less contouring artifacts visible in a reconstructed VDR image.

A VDR encoder under techniques as described herein may take input VDR image data as the only input for image content to be processed by the VDR encoder. While the input VDR image data may be provided to enhancement layer data processing, advanced quantization, which may be performed on-the-fly (e.g., at the same wire speed at which the input VDR is inputted into the VDR encoder), may be used to generate input image data to base layer data processing as described herein.

In some embodiments, an 8 bit quantization step (e.g., 128 of FIG. 1A or 228 of FIG. 2A) as described herein may be preceded by a conversion to make a video (e.g., VDR) signal look more like an SDR signal, as existing encoders such as H.264 may have been adapted for processing an SDR signal. A variety of advanced quantization techniques that move the dynamic range of the VDR signal to look more like an SDR signal may be used. In an example embodiment, an invertible color grading method (e.g., Slope+Offset+Power+Hue+Saturation or SOP+HS) may be used to transform sparse data to targeted ranges. In another example embodiment, a tone mapping curve used in display management may be used to transform the VDR signal to look more like an SDR signal. Here, the term "display management" refers to one or more operations that are performed to adapt a VDR video signal to a dynamic range as supported by a specific display or a specific range of displays.

Advanced quantization as described herein may be performed in one or more different ways. Advanced quantization may perform a global quantization in which an entire frame or an entire scene is quantized using a single setting. Advanced quantization may also perform a partition-based (local) quantization in which each frame is partitioned into a plurality of non-overlapping regions and each non-overlapping region is quantized using its own setting. Advanced quantization may perform a partition-based (local) quantization in which each frame is partitioned into a plurality of non-overlapping regions and each non-overlapping region is quantized using its own setting, but quantizer settings for a specific non-overlapping region are determined based on analysis data derived from one or more overlapped regions. Advanced quantization may be applied in any of one or more different color spaces. Examples of color spaces in which advanced quantization may be applied include, but are not only limited to, any of: RGB color spaces, YCbCr color spaces, YCoCg color spaces, ACES color spaces, or other color spaces.

In some embodiments, a color space in which quantization is applied is kept the same as a color space in which prediction is performed. This may be so in both VDR image encoding process and VDR image decoding process. Color space transformation may be performed as appropriate if a color space in which image rendering occurs is different from a color space in which quantization occurs.

4. LINEAR STRETCHING

Figure 3:
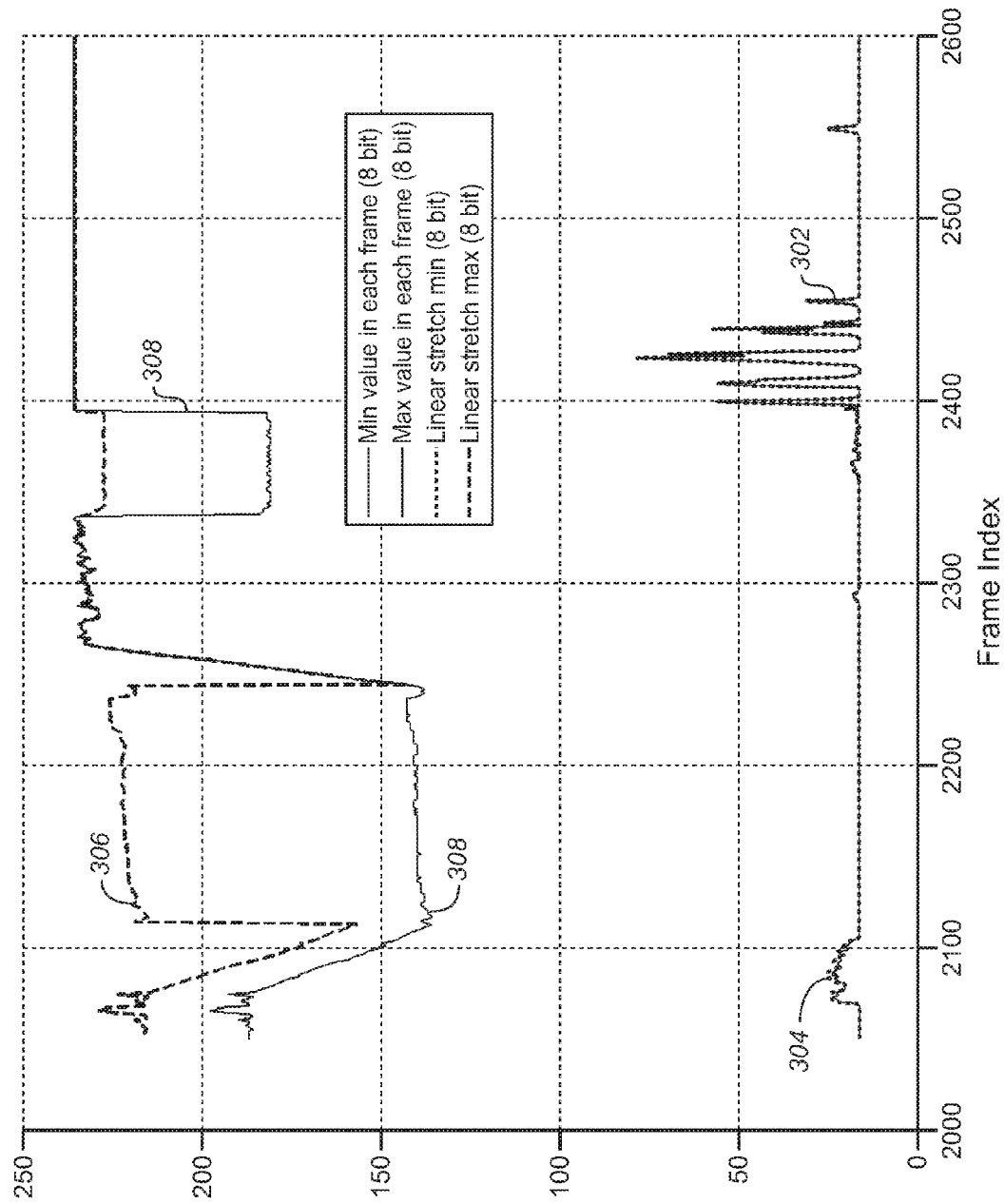
FIG. 3 illustrates scene-adaptive dynamic range adjustment quantization as applied in an YCbCr color space, in accordance with an example embodiment.

In an example embodiment, a scene-adaptive dynamic range adjustment quantization method may be applied in advanced quantization, as illustrated in FIG. 1A and FIG. 2A, in an YCbCr color space, as illustrated in FIG. 3, or an RGB color space. The maximal value in color channel i within one considered scene may be denoted as $v_{i,max}$. The minimal value in color channel i within one considered scene may be denoted as $v_{i,min}$. The range as defined by minimal and maximal and/or distribution of data points within the range may be changed based on image content from frame to frame, from multiple frames to multiple frames, from scene to scene, from multiple scene to multiple scene, from program to program, etc.

A to-be-processed pixel value in color channel i may be denoted as $v_i$. The following expression may be held true where a VDR (e.g., luminance) coding space is in 16 bits (or 12+ bits of FIG. 1 and FIG. 2):

$$0 \le v_{i,min} \le v_{i,max} \le 2^{16}-1 \qquad (1)$$

The scene-adaptive dynamic range adjustment quantization method maps the entire range $[v_{i,min}, v_{i,max}]$ to an 8-bit YCbCr 709 standard range $[s_{i,min}, s_{i,max}]$, as follows:

$$s_i = \text{round}\left(\frac{s_{i,max} - s_{i,min}}{v_{i,max} - v_{i,min}} \cdot (v_i - v_{i,min}) + v_{i,min}\right), \qquad (2)$$

where $s_i$ denotes the converted pixel value in the image data generated by the advanced quantization, as illustrated in FIG. 1A and FIG. 2A. In expression (2) the round( ) operation guarantees that the output will be an integer. Rounding may also be followed by a clipping function. For example, negative values may be clipped to zero and positive values larger than 255 may be clipped to 255.

As illustrated in FIG. 3, the scene-adaptive dynamic range adjustment quantization may be used to fully utilize the whole 8 bit dynamic range. The horizontal axis of the quantization-range-versus-frame-index chart in FIG. 3 represents a frame index variable. The minimum value for linear stretching, $s_{i,min}$ as indicated by plot 302, in each frame may be set the same as the minimum value, $v_{i,min}$ as indicated by plot 304, in the frame. The maximum value for linear stretching, $s_{i,max}$ as indicated by plot 306, in each frame, however, may be set to be no less than the maximum value, $v_{i,max}$ as indicated by plot 308, in the frame. As depicted in FIG. 3, in frame 2200, under other coding techniques (e.g., other than linear stretching coding techniques), the maximum value is about 140. In contrast, using the linear stretching techniques as described herein, the maximum value for frame 2200 is extended to about 225. Thus, linear stretching as described herein provides more quantization steps relative to the other coding techniques and hence provides better resolution details. As illustrated, clipping starts occurring at a frame near frame 2400 and continues to frame 2600 for both linear stretching and the other techniques.

5. EXAMPLE PROCESS FLOWS

Figure 4A:
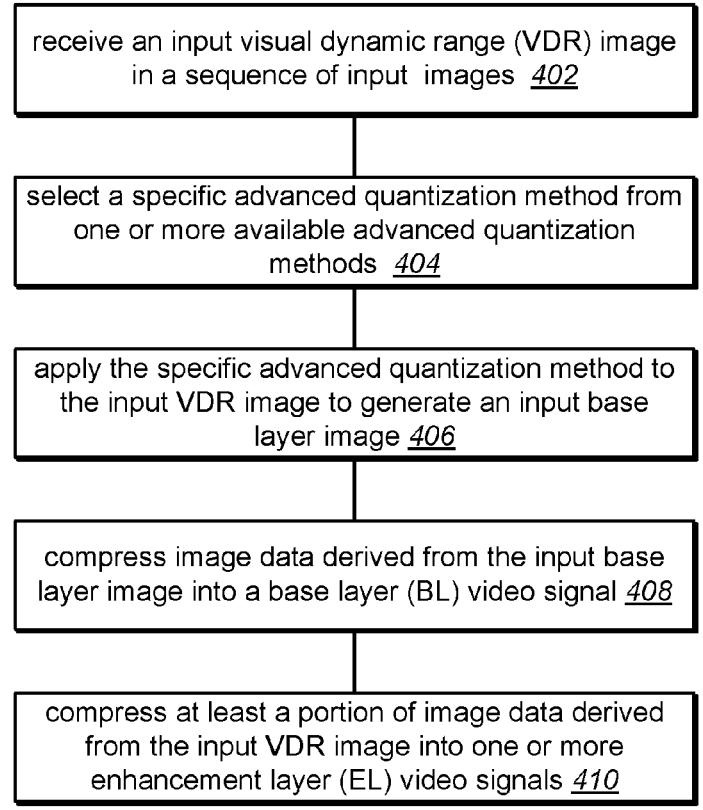
FIG. 4A and FIG. 4B illustrate example process flows, according to example embodiments of the present invention.

FIG. 4A illustrates an example process flow according to an example embodiment of the present invention. In some example embodiments, one or more computing devices or components may perform this process flow. In block 402, a multi-layer VDR video encoder (e.g., 102 of FIG. 1) receives an input visual dynamic range (VDR) image in a sequence of input images.

In block 404, the multi-layer VDR video encoder (102) selects a specific advanced quantization method from one or more available advanced quantization methods.

In block 406, the multi-layer VDR video encoder (102) applies the specific advanced quantization method to the input VDR image to generate an input base layer image. In an example embodiment, the input VDR image comprises higher bit depth VDR image data, whereas the input base layer image comprises lower bit depth VDR image data.

In block 408, the multi-layer VDR video encoder (102) compresses image data derived from the input base layer image into a base layer (BL) video signal.

In block 410, the multi-layer VDR video encoder (102) compresses at least a portion of image data derived from the input VDR image into one or more enhancement layer (EL) video signals.

In an example embodiment, the multi-layer VDR video encoder (102) decodes a base layer image from the BL video signal, the base layer image corresponding to the input base layer image; selects a prediction method from one or more prediction methods; generates a prediction image based at least in part on the base layer image using the prediction method; generates residual values based on the prediction image and the input VDR image; applies non-linear quantization to the residual values to generate output EL image data, the residual values comprising higher bit depth values, and the output EL image data comprising lower bit depth values; and compresses the output EL image data into the one or more EL video signals.

In an example embodiment, the prediction method is selected based on a correspondence relationship between the advanced quantization method and the prediction method.

In an example embodiment, the advanced quantization method comprises one or more of global quantization, linear quantization, linear stretching, curve-based quantization, probability-density-function (Pdf) optimized quantization, LLoyd-Max quantization, partition-based quantization, perceptual quantization, vector quantization, or other types of quantization.

In an example embodiment, the sequence of input images comprises a second different VDR input image; and the multi-layer video encoder (102) selects a second different specific advanced quantization method from the one or more available advanced quantization methods; applies the second specific advanced quantization method to the second input VDR image to generate a second input base layer image; compresses second image data derived from the second input base layer image into the base layer (BL) video signal; and compresses at least a portion of image data derived from the second input VDR image into the one or more enhancement layer (EL) video signals.

In an example embodiment, the multi-layer video encoder (102) decodes a second different BL image from the base layer video signal, the second BL image corresponding to the second input BL image; selects a second different prediction method from the one or more prediction methods; generates a second prediction image based at least in part on the second BL image using the second prediction method; computes second different residual values based on the second prediction image and the second input VDR image; applies non-linear quantization to the second residual values to generate second output EL image data, the second residual values comprising higher bit depth values, and the second output EL image data comprising lower bit depth values; and compresses the output EL image data into the one or more EL video signals.

In an example embodiment, the image data in the input base layer image is compressed by a first 8 bit encoder in a VDR encoder into the BL video signal, whereas the at least a portion of image data in the input VDR image is compressed by a second 8 bit encoder in the VDR encoder into the one or more enhancement layer (EL) video signals.

In an example embodiment, the advanced quantization method is selected based on one or more factors including but not limited to minimizing an amount of image data to be encoded into the one or more EL video signals relative to the input VDR image.

In an example embodiment, the advanced quantization method is selected based on one or more factors including but not limited to any of one or more characteristics determined from the input VDR image.

In an example embodiment, color grading by a colorist is disabled after the input VDR image is received by the multi-layer video encoder (102).

In an example embodiment, a first image container is used to hold the image data derived from the input base layer image, whereas a second different image container is used to hold the at least a portion of image data in the input VDR image. In an example embodiment, at least one of the first image container and the second image container comprises pixel values in one or more channels in a color space. In an example embodiment, at least one of the first image container and the second image container is selected from a plurality of image containers associated with a plurality of sampling schemes, and wherein the plurality of sampling schemes comprises any of: a 4:4:4 sampling scheme, a 4:2:2 sampling scheme, a 4:2:0 sampling scheme, or other sampling schemes.

In an example embodiment, the multi-layer video encoder (102) converts one or more input VDR images represented, received, transmitted, or stored with one or more input video signals into one or more output VDR images represented, received, transmitted, or stored with one or more output video signals.

In an example embodiment, at least one of the input VDR image and the one or more EL video signals comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

Figure 4B:
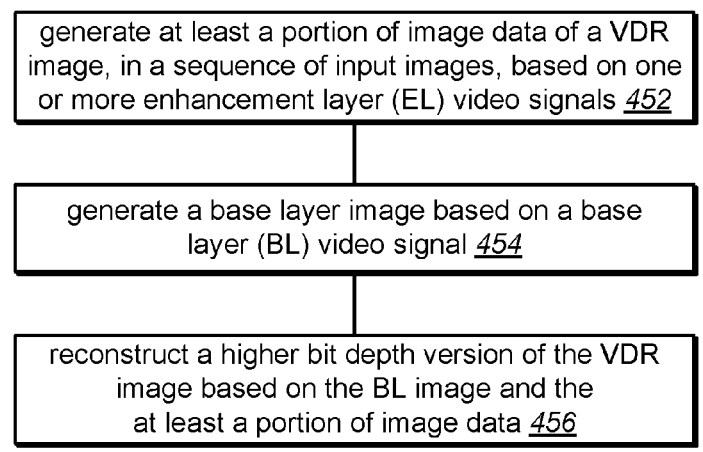

FIG. 4B illustrates an example process flow according to an example embodiment of the present invention. In some example embodiments, one or more computing devices or components may perform this process flow. In block 452, a multi-layer video decoder (e.g., 150 of FIG. 1B) generates at least a portion of image data of a VDR image, in a sequence of input images, based on one or more enhancement layer (EL) video signals.

In block 454, the multi-layer video decoder (150) generates a base layer image based on a base layer (BL) video signal, the base layer image comprising lower bit depth VDR image data, of the VDR image, generated by a specific advanced quantization method selected from one or more available advanced quantization methods.

In block 456, the multi-layer video decoder (150) reconstructs a higher bit depth version of the VDR image based on the base layer image and the at least a portion of image data.

In an example embodiment, the multi-layer video decoder (150) receives prediction metadata including, but not limited only to, a set of mapping parameters; determines a prediction method based on the prediction metadata; generates a prediction image based at least in part on the base layer image using the prediction method; reconstructs the higher bit depth version of the VDR image by combining the prediction image with the at least a portion of image data derived from the one or more EL video signals.

In an example embodiment, the prediction method corresponds to the advanced quantization method.

In an example embodiment, the advanced quantization method comprises one or more of global quantization, linear quantization, linear stretching, curve-based quantization, probability-density-function (Pdf) optimized quantization, LLoyd-Max quantization, partition-based quantization, perceptual quantization, vector quantization, or other types of quantization.

In an example embodiment, the base layer image is derived by a first 8 bit decoder in a VDR decoder from the BL video signal, and wherein the at least a portion of image data in the VDR image is derived by a second 8 bit decoder in the VDR decoder from the one or more enhancement layer (EL) video signals.

In an example embodiment, the advanced quantization method was selected based on one or more factors including, but not limited to, minimizing an amount of image data to be derived from the one or more EL video signals relative to a source VDR image.

In an example embodiment, a first image container is used to hold the image data in the base layer image, whereas a second different image container is used to hold the at least a portion of image data of the VDR image. In an example embodiment, at least one of the first image container and the second image container comprises pixel values in one or more channels in a color space. In an example embodiment, at least one of the first image container and the second image container is selected from a plurality of image containers associated with a plurality of sampling schemes, and wherein the plurality of sampling schemes comprises any of: a 4:4:4 sampling scheme, a 4:2:2 sampling scheme, a 4:2:0 sampling scheme, or other sampling schemes.

In an example embodiment, the multi-layer video decoder (150) processes one or more VDR images represented, received, transmitted, or stored with one or more input video signals.

In an example embodiment, at least a portion of the higher bit depth version of the VDR image comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

In various example embodiments, an encoder, a decoder, a system, an apparatus, or one or more other computing devices performs any or a part of the foregoing methods as described.

6. ADAPTIVE DYNAMIC RANGE ADJUSTMENT

Fade-ins and fade-outs are special scene-transition effects that are commonly used in video production. In a fade-in, brightness increases gradually until the scene is at full brightness. During a fade-out, a scene starts at full brightness and disappears gradually. Because of the change in luminance during these transitions, motion estimation techniques may fail to accurately determine the best motion vectors, resulting in larger residuals and more inefficient video coding.

In certain embodiments where the linear stretching quantizer is applied (e.g., equation (2)), it is desirable to maintain a relatively constant VDR to base layer (BL) quantization step within a scene. This approach, denoted herein as "scene-based adaptation", reduces the amount of quantization-related metadata that needs to be transmitted from the encoder to the decoder and also maintains a relatively constant brightness in a scene, which assists the subsequent compression process. However, such an approach may not be suitable during fade-ins or fade-outs. As described herein, a "frame-by-frame based adaptation" may be better suited for such transitions.

Suppose there are F frames during a fade-in or fade-out transition. For a certain color component (e.g., Luminance Y), for the i-th frame in the original VDR sequence, denote as $v_{H,i}$ and $v_{L,i}$ (i=0, . . . , F−1) as the maximum and minimum values for that color component, respectively. Similarly, denote as $c_{H,i}$ and $c_{L,i}$ (i=0, . . . , F−1) as the maximum and minimum value for the corresponding color component in the i-th BL frame, respectively. Using the linear stretching quantization method, from equation (2), the value of the j-th pixel in the i-th frame of the quantized base layer stream may be expressed as:

$$s_{ji} = Q_i(v_{ji}) = \left\lfloor \frac{c_{H,i} - c_{L,i}}{v_{H,i} - v_{L,i}}(v_{ji} - v_{L,i}) + c_{L,i} + O \right\rfloor, \quad (3)$$

where $v_{ji}$ denotes the value of the j-th pixel in the i-th VDR frame and O is a rounding offset (e.g., O=0.5 or O=0). As applied herein, the floor function $\lfloor x \rfloor$ computes the greatest integer less than or equal to x.

For a fade-out scene, the first frame should have the maximal dynamic range, namely, $v_{H,0} \geq v_{H,i}$ for 0<i<F.

For a fade-in scene, the last frame should have the maximal dynamic range, namely, $v_{H,F-1} \geq v_{H,i}$ for 0≤i<F−1.

Given the above formulation, a problem that arises is how in equation (3) one may adaptively adjust the $\{c_{H,i}|i=0, \ldots, F-1\}$ and $\{c_{L,i}|i=0, \ldots, F-1\}$ parameters in order to optimize subsequent coding performance.

Full-Search Method

In one embodiment one may try all possible combinations of $\{c_{H,i}|i=0, \ldots, F-1\}$ and $\{c_{L,i}|i=0, \ldots, F-1\}$ and select those variables that provide the best overall compression. However, even if one sets $c_{L,i}=0$, for 8-bit data, there are $255^F$ possible combinations for $c_{H,i}$, which may be impractical to try and test in real-time encoding.

The Equal Max-Value Method

In another embodiment, one may set all $c_{H,i}$ values (i=0, . . . , F−1) to a scene-dependent maximal value, $c_{H,max}$. In an embodiment, $c_{H,max}$ may represent the value being used in either the previous or next scene with constant brightness, namely, a scene with no fade-in or fade-out (e.g., $c_{H,i}=c_{H,max}=255$, for all i in [0, F−1]). Similarly, $c_{L,i}$ may be set to the minimal value, $c_{L,min}$, which was used in the previous or next scene without fade in/fade out (e.g., $c_{L,i}=c_{L,min}=0$, for all i in [0, F−1].) In such an embodiment, all BL frames within the fade-in or fade-out scene will have the same dynamic range $[c_{L,min}\ c_{H,max}]$; however, the VDR to BL quantization step from frame to frame may be different. From equation (3), this adaptive quantization approach (also to be referred as frame-by-frame-adaptation) for fade-in and fade-out transitions may be expressed as:

$$s_{ji} = Q_i(v_{ji}) = \left\lfloor \frac{c_{H,max} - c_{L,min}}{v_{H,i} - v_{L,i}}(v_{ji} - v_{L,i}) + c_{L,min} + O \right\rfloor. \quad (4)$$

A decision algorithm to detect whether to apply scene-based adaptation (e.g., apply equations (2) or (3) with constant quantization for the whole scene) or frame-by-frame adaptation (e.g., apply equation (4)) is described next.

Decision Algorithm

In an embodiment, consider two consecutive VDR frames, say frames $v_{i-1}$ and $v_i$. Then, a decision algorithm may be derived by comparing histograms of the corresponding quantized BL frames $s_{i-1}$ and $s_i$. While the algorithm is described for a single color component (e.g., luminance), the operations may be repeated for all color component.

Step 1: Assume frame-by-frame (fbf) adaptive quantization and compute BL pixel values Given frames and $v_{i-1}$ and $v_i$, one may apply equation (4) to compute pixel values in the corresponding BL frames as:

(a) For frame i−1

$$s_{ji-1}^{fbf} = Q_{i-1}^{fbf}(v_{ji-1}) = \left\lfloor \frac{c_{H,max} - c_{L,min}}{v_{H,i} - v_{L,i}}(v_{ji} - v_{L,i}) + c_{L,min} + O \right\rfloor. \quad (5)$$

(b) For frame i $$s_{ji}^{fbf} = Q_i^{fbf}(v_{ji}) = \left\lfloor \frac{c_{H,max} - c_{L,min}}{v_{H,i} - v_{L,i}}(v_{ji} - v_{L,i}) + c_{L,min} + O \right\rfloor. \quad (6)$$

Without loss of generality, assuming 8-bits per color component in the BL stream, for frames and $s_{i-1}$ one may use the output of equations (5) and (6) to compute the corresponding histograms, each with 256 bins, as $H_{i-1}^{fbf}(n)$ and $H_i^{fbf}(n)$, for n=0, 1, . . . , 255. As used herein, the term histogram denotes a function that counts the number of observed pixels that fall into each one of the possible distinct pixel values. For example, $H_i^{fbf}(20)=10$, denotes that 10 pixels in frame i−1 have the value 20.

Step 2: Calculate the mean-square difference between $H_{i-1}^{fbf}(n)$ and $H_i^{fbf}(n)$ Given the histograms computed in Step 1, one may compute their mean-square difference as $$D_i^{fbf} = \frac{1}{256} \sum_{n=0}^{255} \left\| H_{i-1}^{fbf}(n) - H_i^{fbf}(n) \right\|^2. \quad (7)$$

The process may now be repeated under the assumption of using a scene-based adaptive (sb) quantization.

Step 3: Calculate the minimum and maximum pixel values among frame i−1 and frame i $v_{Lmin} = \min\{v_{L,i-1}, v_{L,i}\}$, and $v_{Hmax} = \max\{v_{H,i-1}, v_{H,i}\}$.

Then, given frames $v_{i-1}$ and $v_i$, one may apply those values and equation (3) to compute the corresponding BL pixel values as $$s_{ji-1}^{sb} = Q_{i-1}^{sb}(v_{ji-1}) = \left\lfloor \frac{c_{H,max} - c_{L,min}}{v_{Hmax} - v_{Lmin}}(v_{ji-1} - v_{Lmin}) + c_{L,min} + O \right\rfloor, \qquad (8)$$

and $$s_{ji}^{sb} = Q_i^{sb}(v_{ji}) = \left\lfloor \frac{c_{H,max} - c_{L,min}}{v_{Hmax} - v_{Lmin}}(v_{ji} - v_{Lmin}) + c_{L,min} + O \right\rfloor. \qquad (9)$$

Using the output of equations (8) and (9), one may compute frame histograms $H_i^{sb}(n)$, and $H_{i-1}^{sb}(n)$, for n=0, 1, ... , 255.

Step 4: Calculate the mean-square difference between $H_{i-1}^{sb}(n)$ and $H_i^{sb}(n)$ $$D_i^{sb} = \frac{1}{256}\sum_{n=0}^{255} \|H_{i-1}^{sb}(n) - H_i^{sb}(n)\|^2. \qquad (10)$$

Step 5: An adaptive decision to apply either frame-by-frame or scene-based adaptation may be based on the difference between the two mean-square differences:

---
if $D_i^{fbf} < D_i^{sb}$ use frame-by-frame adjustment
else
use scene-based adjustment.
---

Figure 6:
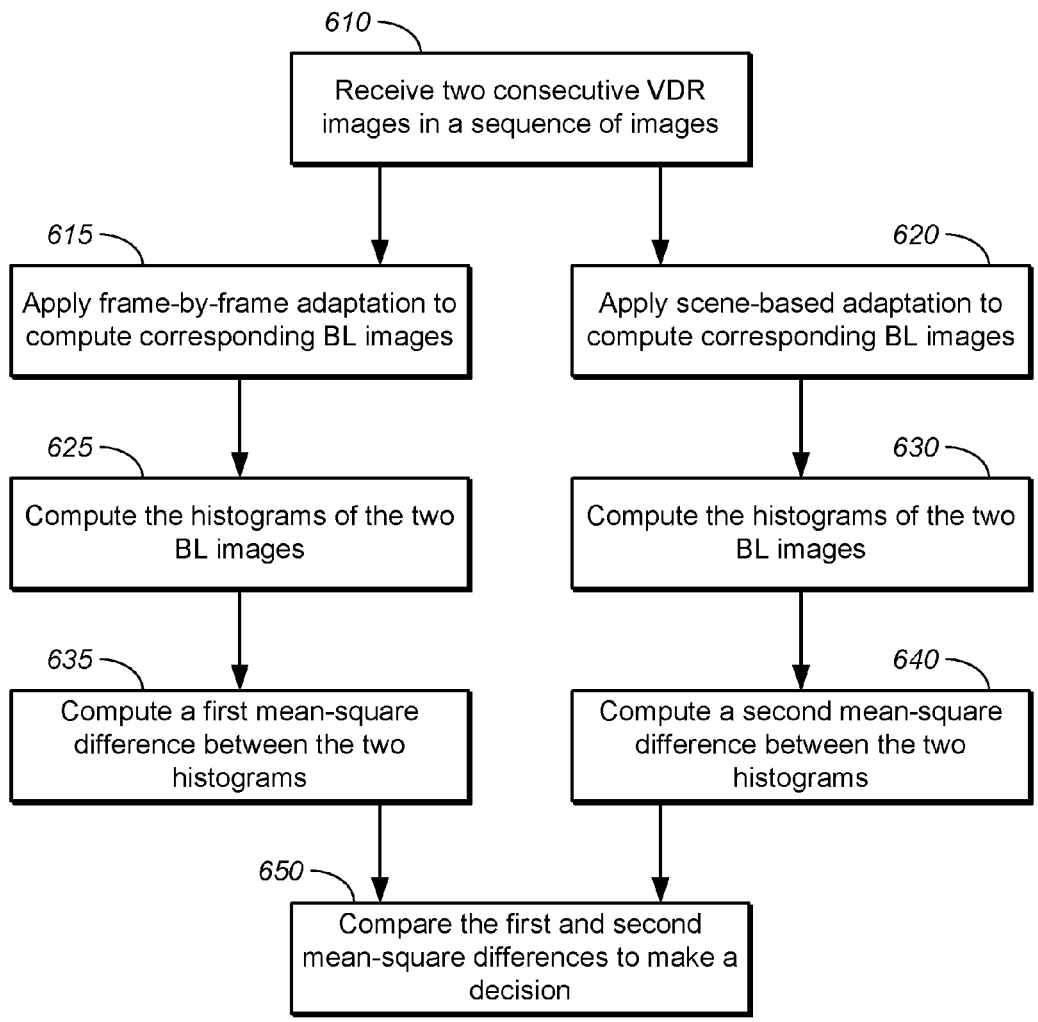
FIG. 6 illustrates an example flow for detecting transition sequences and selecting among two quantization schemes, according to an embodiment of the present invention.

FIG. 6 summarizes an embodiment of the decision algorithm as described herein. In step 610, the process accesses two consecutive images (or frames) in a sequence of input VDR images. Using the methods described herein, steps 625 and 630 compute two alternative representations of the corresponding BL images. Step 625 computes the BL frames using frame-by-frame adaptation (e.g., using equations (5) and (6). Step 630 computes the BL images using scene-based adaptation (e.g., using equations (8) and (9)). Based on these computed BL images, steps 625 and 630 may compute the corresponding histograms (e.g., $H_{i-1}^{fbf}(n)$, $H_i^{fbf}(n)$, $H_i^{sb}(n)$, and $H_{i-1}^{sb}(n)$). Given these histograms, for each set of histograms, steps 635 and 640 may compute a first and a second mean-square difference (e.g., $D_i^{fbf}$ in equation (7) and $D_i^{sb}$ in equation (10)). Finally, in step 650, one may compare the two mean-square differences and select as the quantization method the method that yields the histograms with the smallest mean square difference.

7. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
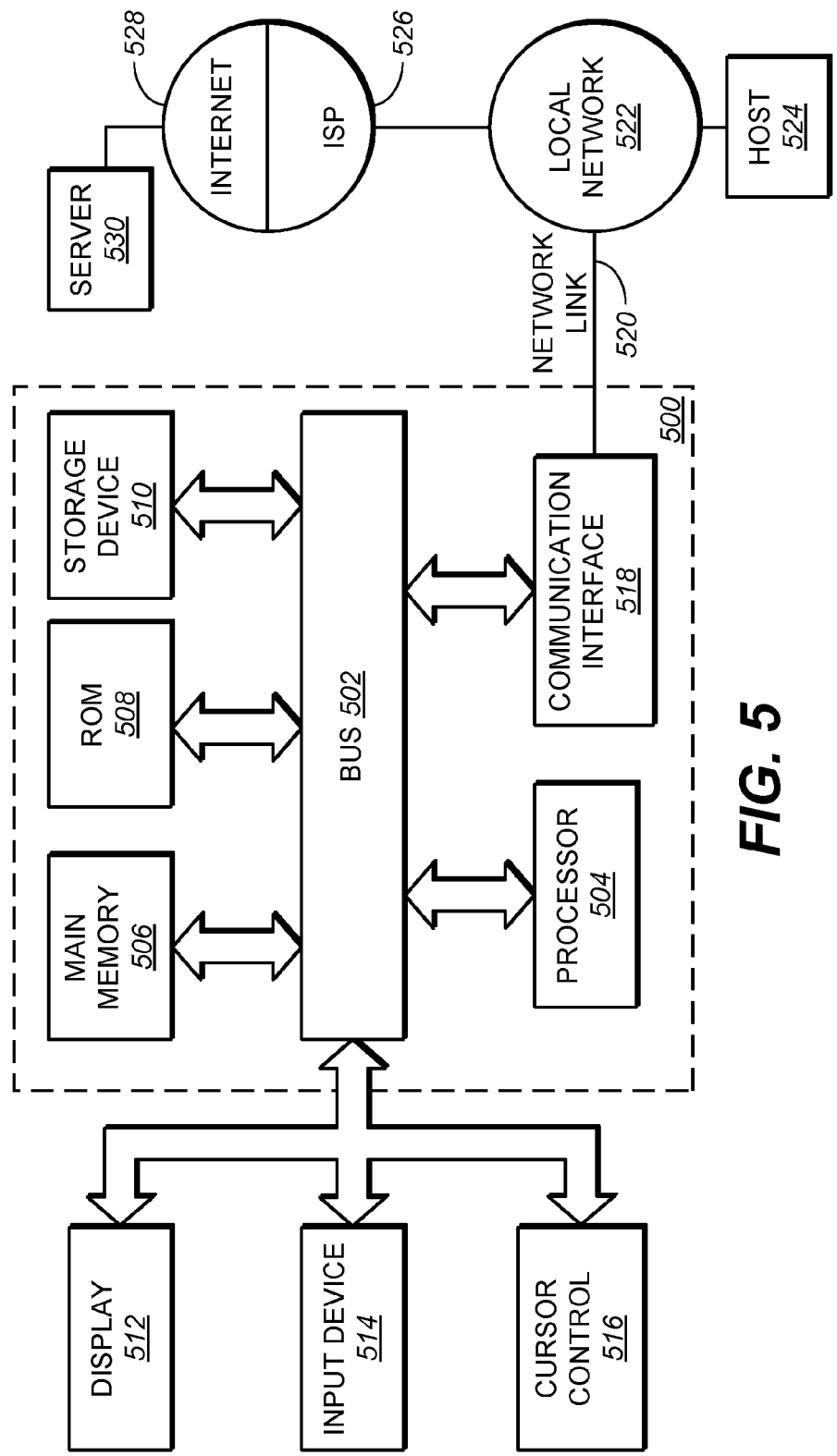
FIG. 5 illustrates an example hardware platform on which a computer or a computing device as described herein may be implemented, according an embodiment of the present invention.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
   receiving an input visual dynamic range (VDR) image in a sequence of input images, wherein the input VDR image is of a first bit depth;
   selecting a specific advanced quantization function from a plurality of available advanced quantization functions for mapping VDR image data of the first bit depth to base layer image data of a second bit depth lower than the first bit depth;
   applying the specific advanced quantization function to the input VDR image to generate an input base layer image, wherein the input base layer image is of the second bit depth;
   wherein the input base layer image as generated by the selected specific advanced quantization function is non-backward-compatible;
   compressing image data derived from the input base layer image into a base layer (BL) video signal; and
   compressing at least a portion of image data derived from the input VDR image into one or more enhancement layer (EL) video signals,
   wherein the advanced quantization method is selected from the plurality of available advanced quantization functions based on one or more factors including minimizing an amount of image data to be encoded into the one or more EL video signals relative to the input VDR image.

2. The method as recited in claim 1, further comprising:
   decoding a BL image from the BL video signal, the BL image corresponding to the input BL image;
   selecting a prediction method from one or more prediction methods;
   generating a prediction image based at least in part on the BL image using the prediction method;
   generating residual values based on the prediction image and the input VDR image;
   applying non-linear quantization to the residual values to generate output EL image data, the residual values comprising higher bit depth values, and the output EL image data comprising lower bit depth values; and
   compressing the output EL image data into the one or more EL video signals.

3. The method as recited in claim 2, wherein the prediction method is selected based on a correspondence relationship between the advanced quantization method and the prediction method.

4. The method as recited in claim 1, wherein the advanced quantization method comprises one or more of global quantization, linear quantization, linear stretching, curve-based quantization, probability-density-function (Pdf) optimized quantization, LLoyd-Max quantization, partition-based quantization, perceptual quantization, or cross-color channel/vector quantization.

5. The method as recited in claim 1, wherein the sequence of input images comprises a second different VDR input image; and the method further comprising:
selecting a second different specific advanced quantization method from the plurality of available advanced quantization methods;
applying the second specific advanced quantization method to the second input VDR image to generate a second input BL image;
compressing second image data derived from the second input base layer image into the BL video signal; and
compressing at least a portion of image data derived from the second input VDR image into the one or more EL video signals.

6. The method as recited in claim 5, further comprising:
decoding a second different BL image from the BL video signal, the second BL image corresponding to the second input BL image;
selecting a second different prediction method from the one or more prediction methods;
generating a second prediction image based at least in part on the second BL image using the second prediction method;
generating second different residual values based on the second prediction image and the second input VDR image;
applying non-linear quantization to the second residual values to generate second output EL image data, the second residual values comprising higher bit depth values, and the second output EL image data comprising lower bit depth values; and
compressing the output EL image data into the one or more EL video signals.

7. The method as recited in claim 1, wherein the image data in the input BL image is compressed by a first 8 bit encoder in a VDR encoder into the BL video signal, and wherein the at least a portion of image data in the input VDR image is compressed by a second 8 bit encoder in the VDR encoder into the one or more EL video signals.

8. The method as recited in claim 1, wherein a first image container is used to hold the image data derived from the input BL image, and wherein a second different image container is used to hold the at least a portion of image data in the input VDR image.

9. The method as recited in claim 8, wherein at least one of the first image container and the second image container comprises pixel values in one or more channels in a color space.

10. The method as recited in claim 8, wherein at least one of the first image container and the second image container is selected from a plurality of image containers associated with a plurality of sampling schemes, and wherein the plurality of sampling schemes comprises any of: a 4:4:4 sampling scheme, a 4:2:2 sampling scheme, or a 4:2:0 sampling scheme.

11. The method as recited in claim 1, further comprising:
determining a specific profile for processing the input VDR image into the BL and EL video signals; and
performing one or more operations related to the specific profile in processing the input VDR image into the BL and EL video signals.

12. A method, comprising:
generating at least a portion of image data of a VDR image of a first bit depth, in a sequence of input images, based on one or more enhancement layer (EL) video signals;
generating a base layer (BL) image, of a second bit depth lower than the first bit depth, based on a BL video signal, the BL image was generated by applying a specific advanced quantization method to the VDR image, the specific advanced quantization method is selected from a plurality of available advanced quantization methods for mapping VDR image data of the first bit depth to base layer image data of the second bit depth;
wherein the BL image as generated by the selected specific advanced quantization function is non-backward-compatible; and
reconstructing a version of the VDR image based on the BL image and the at least a portion of image data of the VDR image, the version of the VDR image comprises reconstructed VDR image data of the first bit depth,
wherein the advanced quantization method was selected from the plurality of available advanced quantization methods based on one or more factors including minimizing an amount of image data to be derived from the one or more EL video signals relative to a source VDR image.

13. The method as recited in claim 12, further comprising:
receiving prediction metadata including a set of mapping parameters;
determining a prediction method based on the prediction metadata;
generating a prediction image based at least in part on the BL image using the prediction method;
reconstructing the higher bit depth version of the VDR image by combining the prediction image with the at least a portion of image data derived from the one or more EL video signals.

14. The method as recited in claim 13, wherein the prediction method corresponds to the advanced quantization method.

15. The method as recited in claim 13, wherein the advanced quantization method comprises one or more of: global quantization, linear quantization, linear stretching, curve-based quantization, probability-density-function (Pdf) optimized quantization, LLoyd-Max quantization, partition-based quantization, perceptual quantization, or vector quantization.

16. The method as recited in claim 13, wherein the BL image is derived by a first 8 bit decoder in a VDR decoder from the BL video signal, and wherein the at least a portion of image data in the VDR image is derived by a second 8 bit decoder in the VDR decoder from the one or more enhancement layer (EL) video signals.

17. The method as recited in claim 12, wherein a first image container is used to hold the image data in the BL image, and wherein a second different image container is used to hold the at least a portion of image data of the VDR image.

18. The method as recited in claim 17, wherein at least one of the first image container and the second image container comprises pixel values in one or more channels in a color space.

19. The method as recited in claim 17, wherein at least one of the first image container and the second image container is selected from a plurality of image containers associated with a plurality of sampling schemes, and wherein the plurality of sampling schemes comprises at least a 4:4:4 sampling scheme, a 4:2:2 sampling scheme, a 4:2:0 sampling scheme, or other sampling schemes.

20. The method as recited in claim 12, further comprising:
  determining a specific profile relating to the BL and EL video signals; and
  performing one or more operations related to the specific profile in reconstructing the higher bit depth version of the VDR image from the BL and EL video signals.

21. A non-transitory computer readable storage medium, storing computer instructions, which when executed by one or more processors cause performing the method as recited in claim 1.

22. A non-transitory computer readable storage medium, storing computer instructions, which when executed by one or more processors cause performing the method as recited in claim 12.

23. An apparatus comprising:
  one or more processors;
  a non-transitory computer readable storage medium, storing computer instructions, which when executed by the one or more processors cause performing the method as recited in claim 1.

24. An apparatus comprising:
  one or more processors;
  a non-transitory computer readable storage medium, storing computer instructions, which when executed by the one or more processors cause performing the method as recited in claim 12.

* * * * *